United States Patent
Hsu (10) Patent No.: US 8,261,697 B2
(45) Date of Patent: Sep. 11, 2012

(54) CAGE NET

(75) Inventor: Hung-Ping Hsu, Changhua County (TW)

(73) Assignee: Gold-Joint Industry Co., Ltd., Taichung Hsien (TW)

( * ) Notice: Subject to any disclaimer, the term of this patent is extended or adjusted under 35 U.S.C. 154(b) by 61 days.

(21) Appl. No.: 12/955,391

(22) Filed: Nov. 29, 2010

(65) Prior Publication Data

US 2011/0139085 A1    Jun. 16, 2011

(30) Foreign Application Priority Data

Dec. 15, 2009   (TW) ................................ 98142877 A (51) Int. Cl.
 *A01K 63/00*    (2006.01)
(52) U.S. Cl. ...................................................... 119/223
(58) Field of Classification Search .......... 119/215–218, 119/223, 226–228; 220/4.12, 4.13, 4.22
 See application file for complete search history.

(56) References Cited

U.S. PATENT DOCUMENTS

| | | | |
|---|---|---|---|
| 3,691,994 A * | 9/1972 | McPherson | 119/223 |
| 4,084,543 A * | 4/1978 | Pequegnat | 119/200 |
| 4,170,196 A | 10/1979 | Yoneya | |
| 5,359,962 A * | 11/1994 | Loverich | 119/223 |
| RE34,971 E * | 6/1995 | Loverich et al. | 119/223 |
| 5,617,813 A * | 4/1997 | Loverich et al. | 119/223 |
| 2005/0235921 A1 | 10/2005 | Niezrecki et al. | |
| 2006/0162667 A1* | 7/2006 | Papadoyianis et al. | 119/223 |
| 2010/0058991 A1* | 3/2010 | Dobson et al. | 119/223 |
| 2011/0308473 A1* | 12/2011 | Buchanan | 119/226 |

FOREIGN PATENT DOCUMENTS

| | | |
|---|---|---|
| CA | 2145338 | 9/1996 |
| CN | 2377833 | 5/2000 |
| CN | 2558213 | 7/2003 |
| ES | 2147537 | 9/2000 |
| WO | 2009115361 A1 | 9/2009 |

* cited by examiner

*Primary Examiner* — Rob Swiatek
*Assistant Examiner* — Ebony Evans
(74) *Attorney, Agent, or Firm* — Whyte Hirschboeck Dudek SC (57) ABSTRACT

A cage net (3) includes a plurality of screen sheets (31) each having an upper section (311) and a tapered lower section (312). The upper sections (311) are interconnected side by side to form a surrounding wall (300), and the lower sections (312) are interconnected side by side to form a bottom wall (301). The lower sections (312) are folded inwardly from the respective upper sections (311) and have tapered ends extending to a substantially central part of the bottom wall (301). The case net (3) can be fabricated conveniently at low cost.

8 Claims, 10 Drawing Sheets

CAGE NET

CROSS-REFERENCE TO RELATED APPLICATION

This application claims priority of ROC Application No. 98142877, filed on Dec. 15, 2009.

BACKGROUND OF THE INVENTION

1. Field of the Invention

The invention relates to a net screen, and more particularly to a cage net.

2. Description of the Related Art

Figure 1:
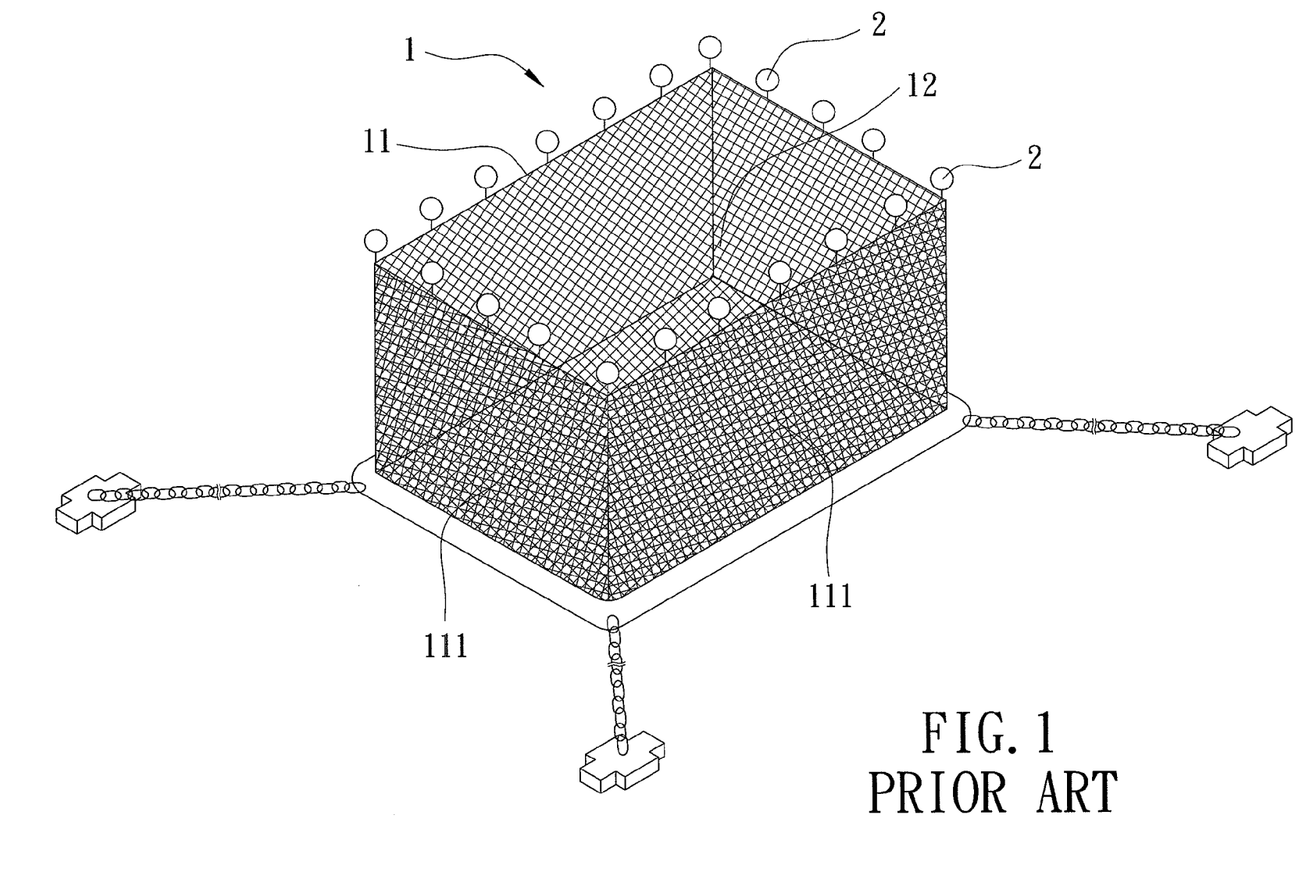
FIG. 1 is a perspective view of a cage net in the prior art.

Referring to FIG. 1, there is shown a conventional cage net 1 connected to a plurality of floating balls 2, and used for farming fish and other aquatic animals. The cage net 1 is a cubic screen 11 confining a receiving space 12 and made from five screen sheets 111. In fabrication, four of the screen sheets 111 are interconnected side by side to form a surrounding wall, and the remaining screen sheet 111 is connected to the bottom end of the surrounding wall. Since each screen sheet 111 has a large area and a long length, the fabrication process thereof is costly and extremely inconvenient. Moreover, when the cage net 1 is not cubic, the shapes and sizes of the screen sheets 111 are different, and the different screen sheets may need to be fabricated individually or differently. Therefore, the fabrication process is complicated and inconvenient.

Figure 2:
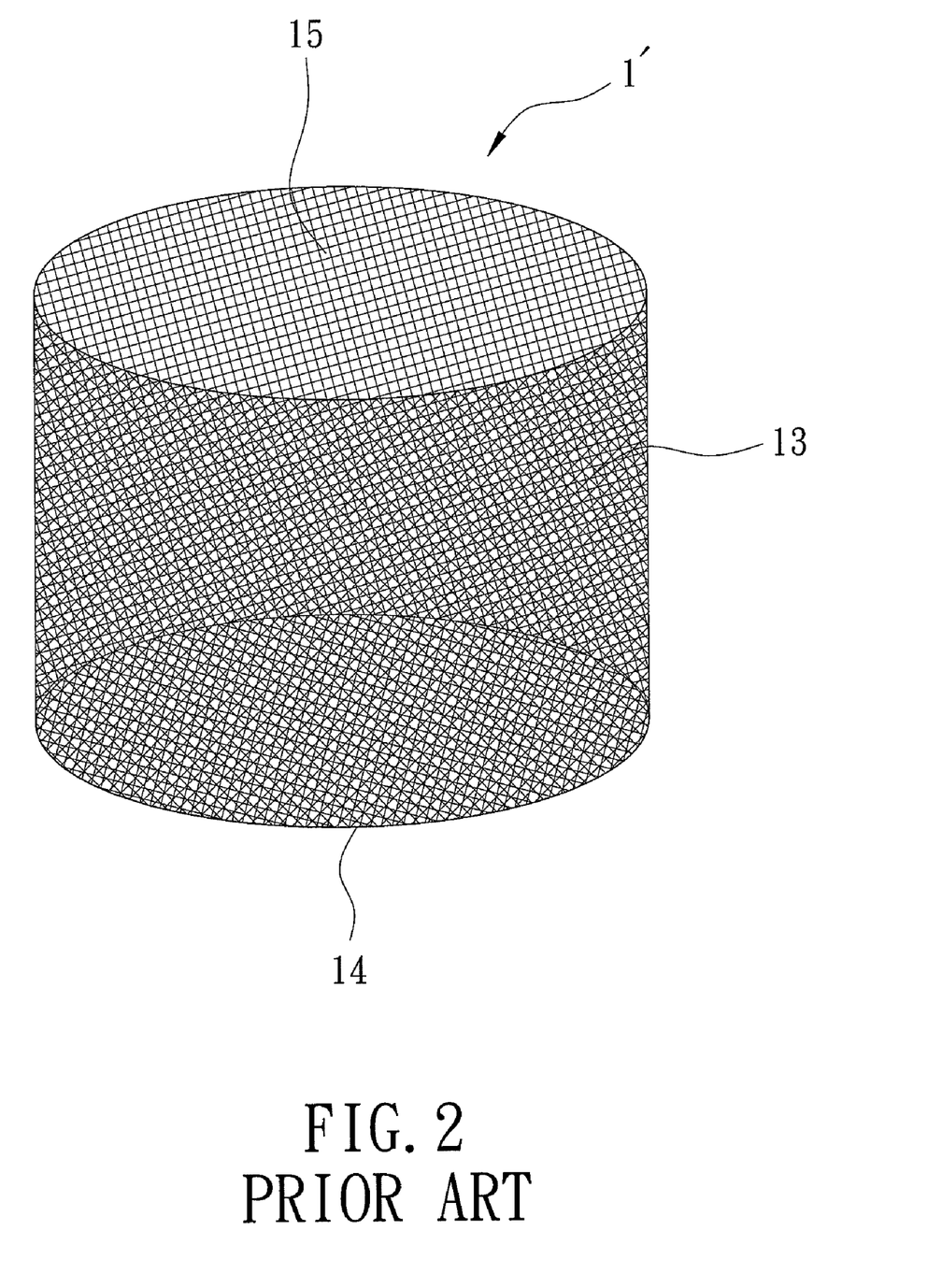
FIG. 2 is a perspective view of another cage net in the prior art.

Referring to FIG. 2, another conventional cage net 1' includes an annular screen sheet 13 and a circular screen sheet 14. Since the circular screen 14 cannot be knitted directly, it is cut from a square screen, thereby resulting in a substantial amount of waste and increased costs. The amount of waste increases when the size of the circular screen 14 increases.

SUMMARY OF THE INVENTION

Therefore, the main object of the present invention is to provide a cage net that can be fabricated conveniently at a reduced cost.

According, a cage net of the present invention includes a plurality of screen sheets each having an upper section and a tapered lower section. The upper sections of the screen sheets are interconnected side by side to form a surrounding wall. The lower sections of the screen sheets are interconnected side by side to form a bottom wall. The lower sections are folded inwardly from the respective upper sections and have tapered ends extending to a substantially central part of the bottom wall. The surrounding and bottom walls confine a receiving space.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

Figure 3:
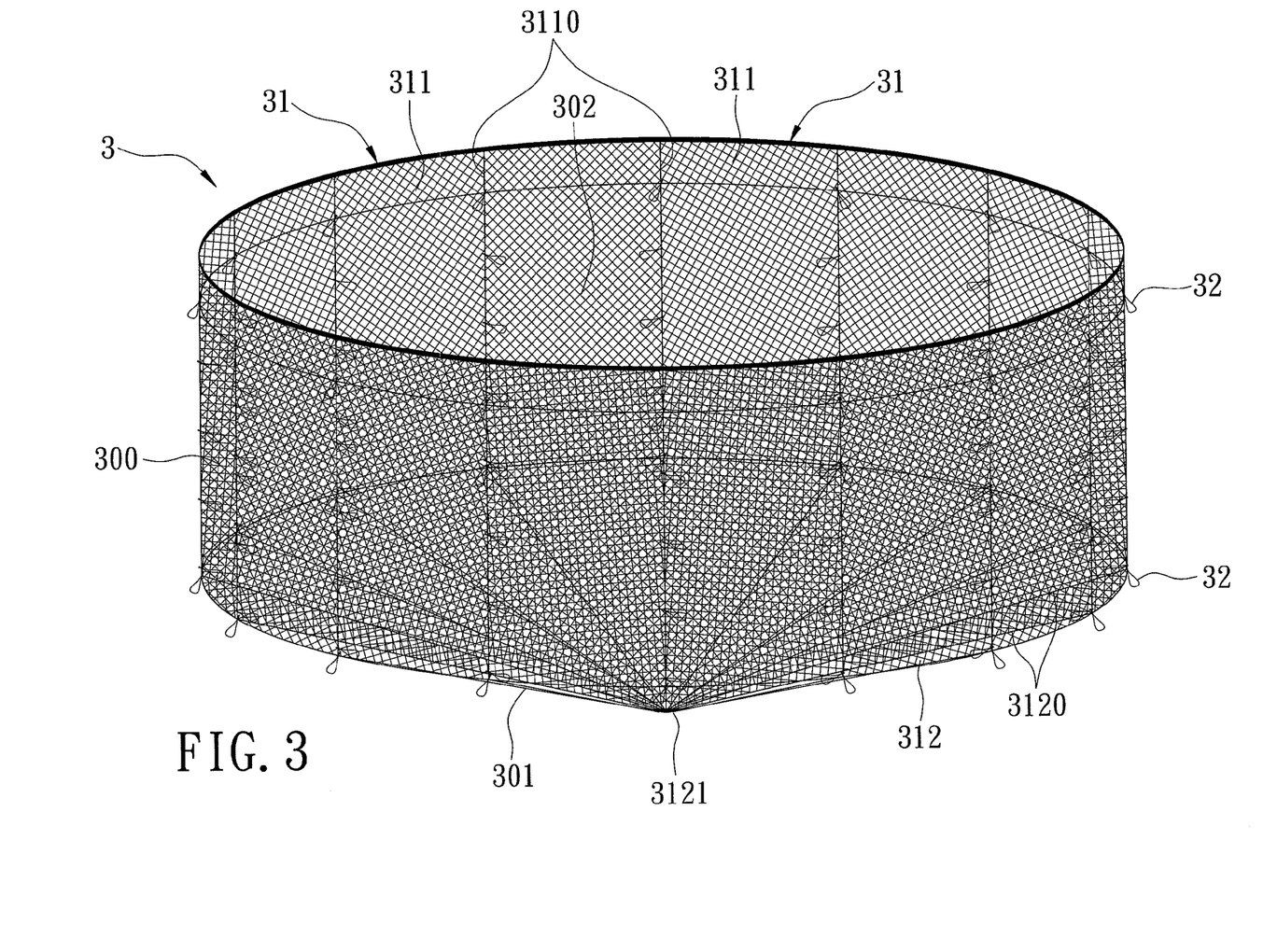
FIG. 3 is a perspective view of the first preferred embodiment of a cage net according to the present invention.
Figure 4:
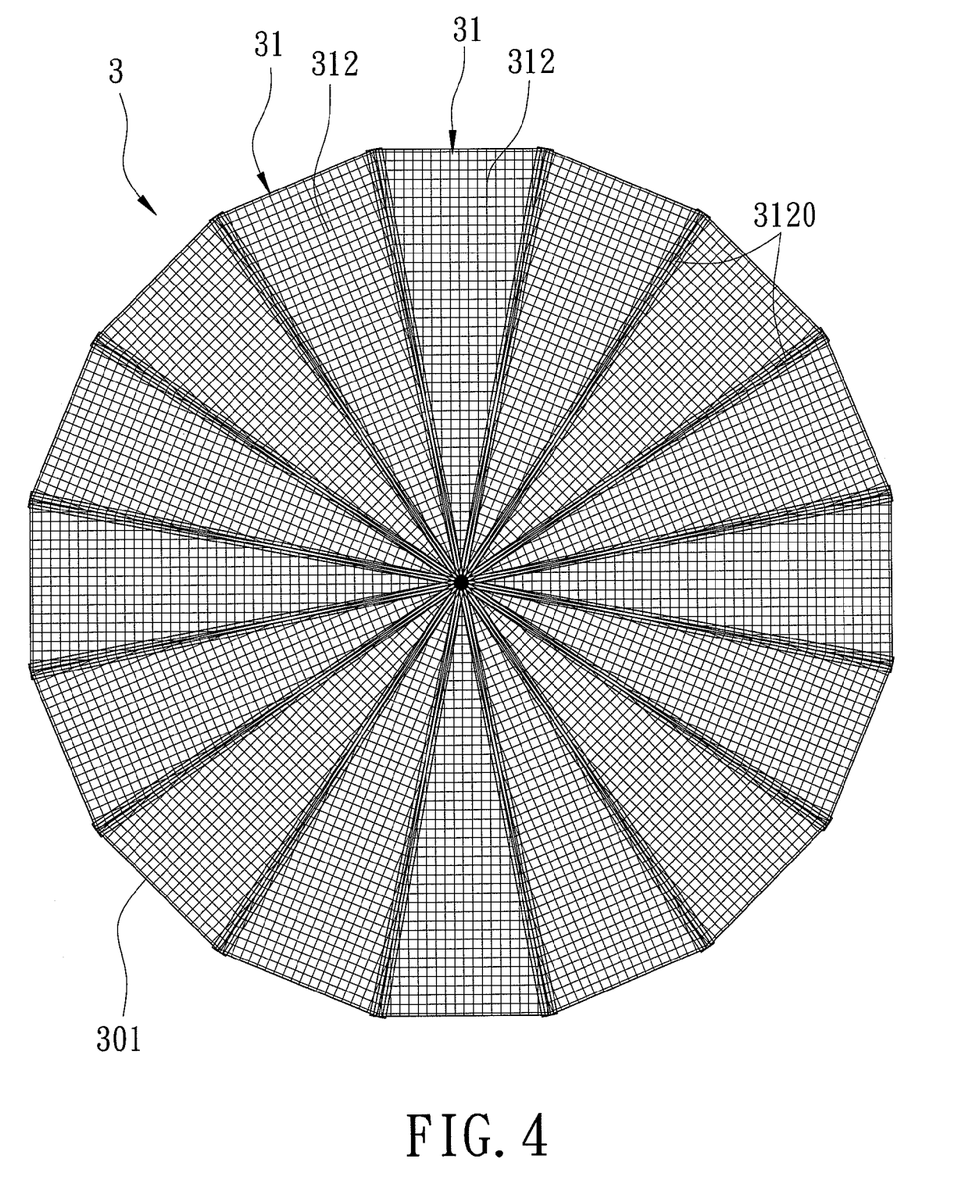
FIG. 4 is a bottom view of the first preferred embodiment.

Referring to FIGS. 3 and 4, there is shown a cage net 3 according to the first preferred embodiment of the present invention, which includes a plurality of screen sheets 31. The screen sheets 31 are lattice screens which may be made from ropes or metal wires. The cage net 3 may be used for farming fish or other aquatic animals. The cage net 3 may also be used as a stone cage to be filled with stones for protecting against erosion environmental structures, such as slopes in mountain areas, beaches, etc.

Each of the screen sheets 31 has an upper section 311 and a tapered lower section 312. The upper sections 311 of the screen sheets 31 are interconnected side by side to form a surrounding wall 300. The lower sections 312 of the screen sheets 31 are interconnected side by side to form a bottom wall 301. The lower sections 312 are folded inwardly from the respective upper sections 311 and have tapered ends 3121 extending to a substantially central part of the bottom wall 301. The surrounding and bottom walls 300, 301 confines a receiving space 302.

Each upper section 311 is rectangular, and has two longitudinal sides 3110 that extend in a top-to-bottom direction and that are respectively connected to two adjacent upper sections 311. Each of the lower sections 312 is in the form of an isosceles triangle, and has two opposite sides 3120 that extend respectively from the longitudinal sides 3110 to the tapered end 3121 thereof and that are connected respectively to two adjacent lower sections 312. The bottom wall 301 has a cone-shape, and the tapering angle of the bottom wall 301 varies depending on the length of the lower section 312. When the length of the lower sections 312 increases, the tapering angle of the bottom wall 301 decreases. While the bottom wall 301 in this embodiment is a cone-shaped wall, it may also be a flat wall. Moreover, the periphery of the bottom wall 301 may be polygonal or approximately circular.

A plurality of tying elements or loops 32 are connected to the surrounding wall 300 for attachment of a rope (not shown). The rope may be threaded through the loops 32 and may be connected to a plurality of floating balls (not shown) for suspending the cage net 3 in water, or connected to other positioning structures to position the cage net 3 in a desired area.

Figure 5:
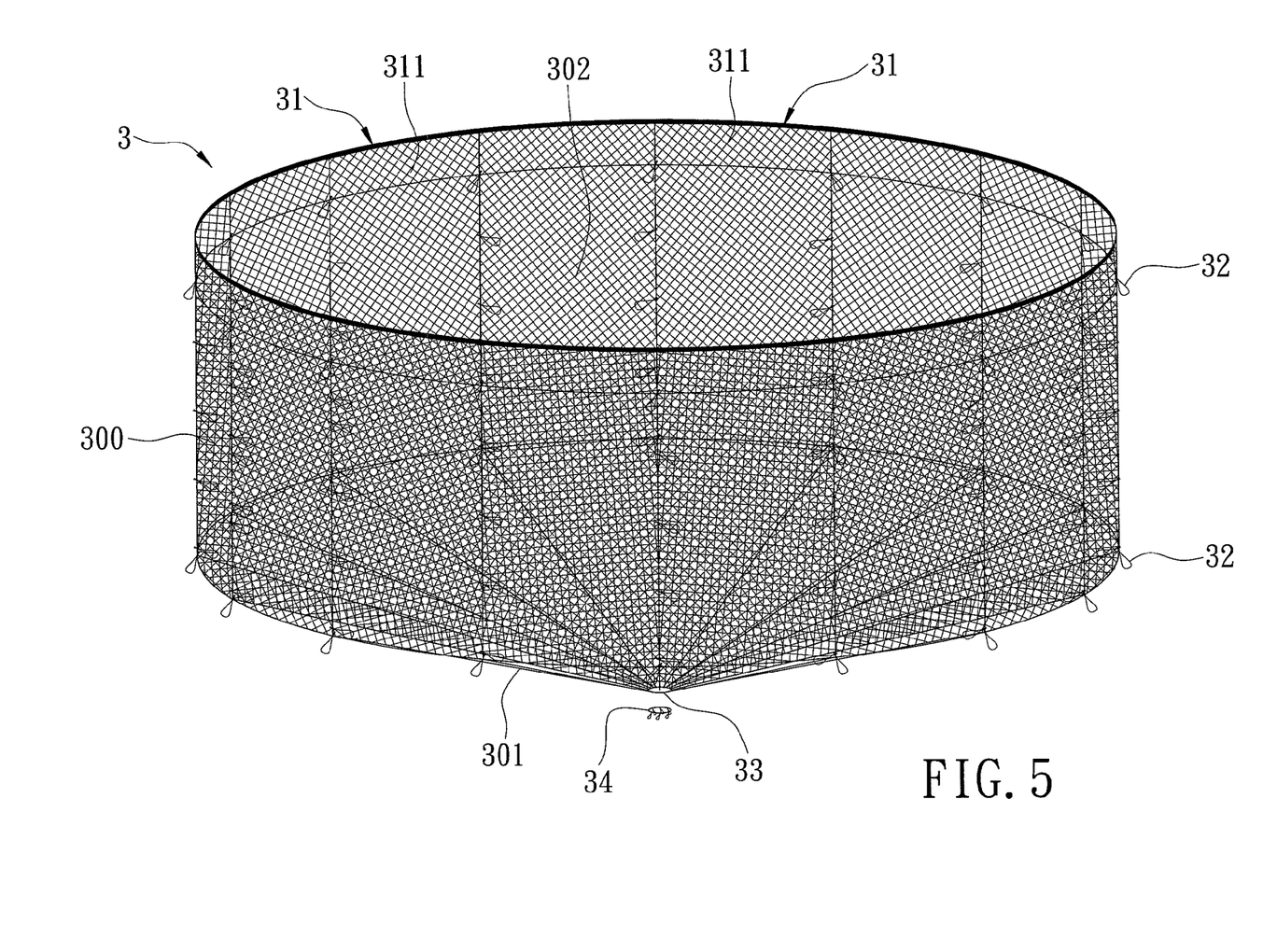
FIG. 5 is a perspective view of the second preferred embodiment of the cage net according to the present invention.
Figure 6:
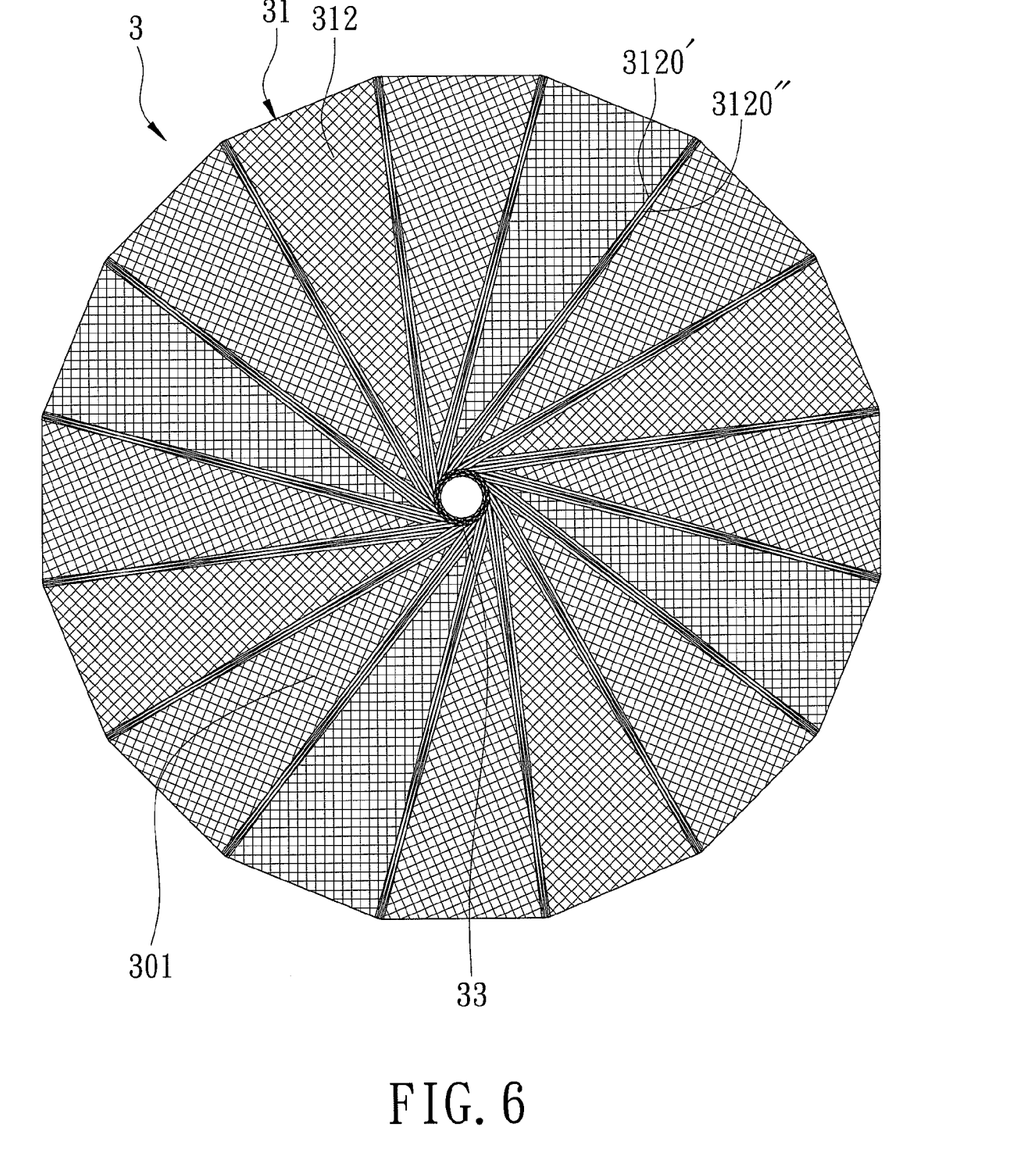
FIG. 6 is a bottom view of the second preferred embodiment.
Figure 7:
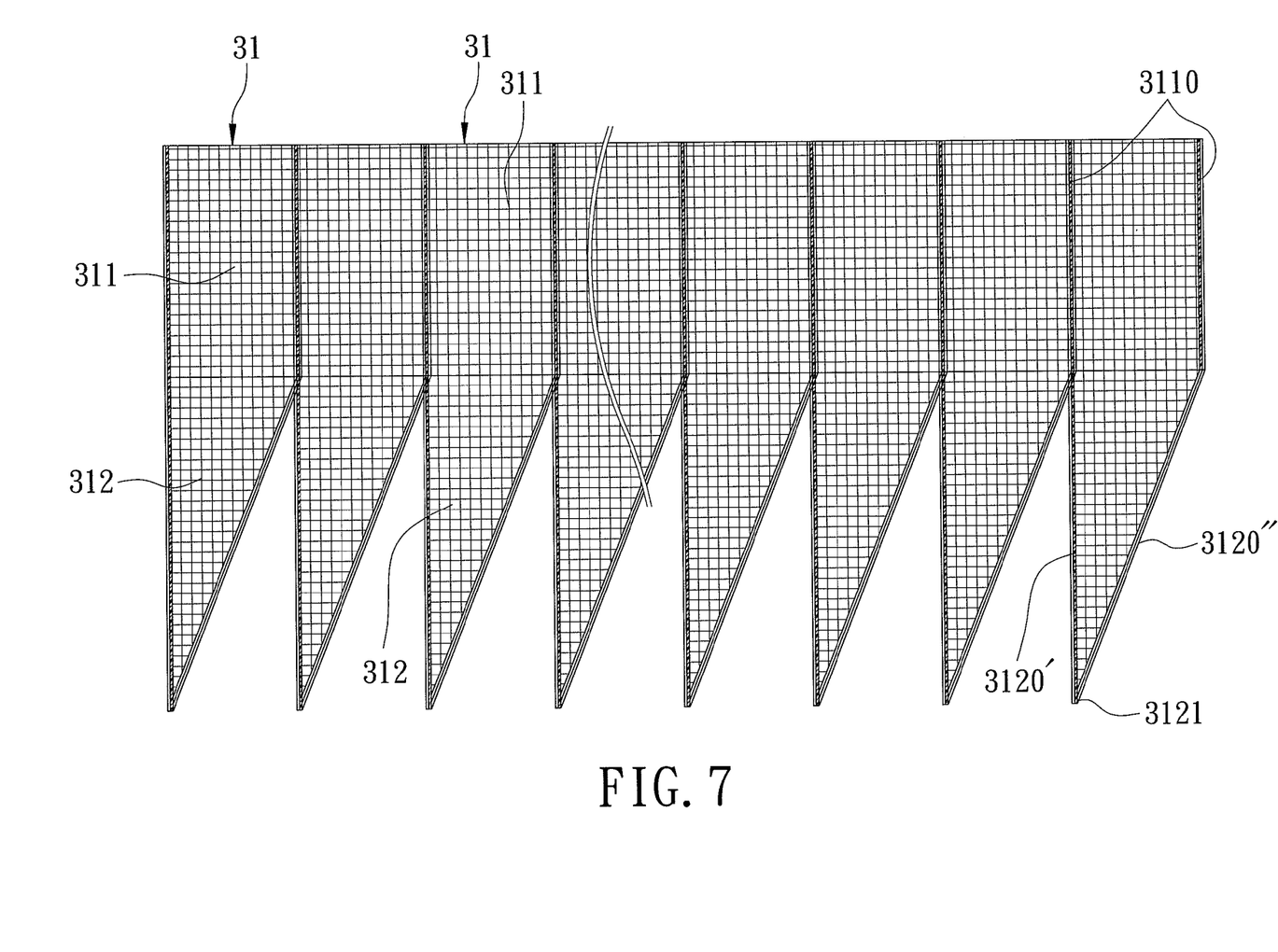
FIG. 7 is an elevation view showing upper sections of the screen sheets of the cage net assembled according to the second preferred embodiment.

Referring to FIGS. 5, 6 and 7, the cage net 3 according to the second preferred embodiment of the present invention is shown, which is generally similar to the first preferred embodiment. The bottom wall 301 of the cage net 3 has a circular opening 33 and a closure member 34 for closing the opening 33. Each upper section 311 is rectangular. Each lower section 312 is in the form of a right-angled triangle and has a short side 3120' and a long side 3120" respectively extending from the two longitudinal sides 3110 of the respective upper section 311 to the tapered end 3121 thereof. As best shown in FIG. 7, the short side 3120' is in line with one of the longitudinal sides 3110, and the long side 3120" is angled from the other one of the longitudinal sides 3110. The short side 3120' of each lower section 312 is connected to the long side 3120" of the adjacent lower section 312. The tapered ends 3121 of the lower sections 312 define the circular opening 33.

As described above, in the first or second preferred embodiments, all of the screen sheets 31 have the same shape and area so that the fabrication of the cage net 3 can be simplified and the manufacturing cost thereof can be reduced.

Figure 8:
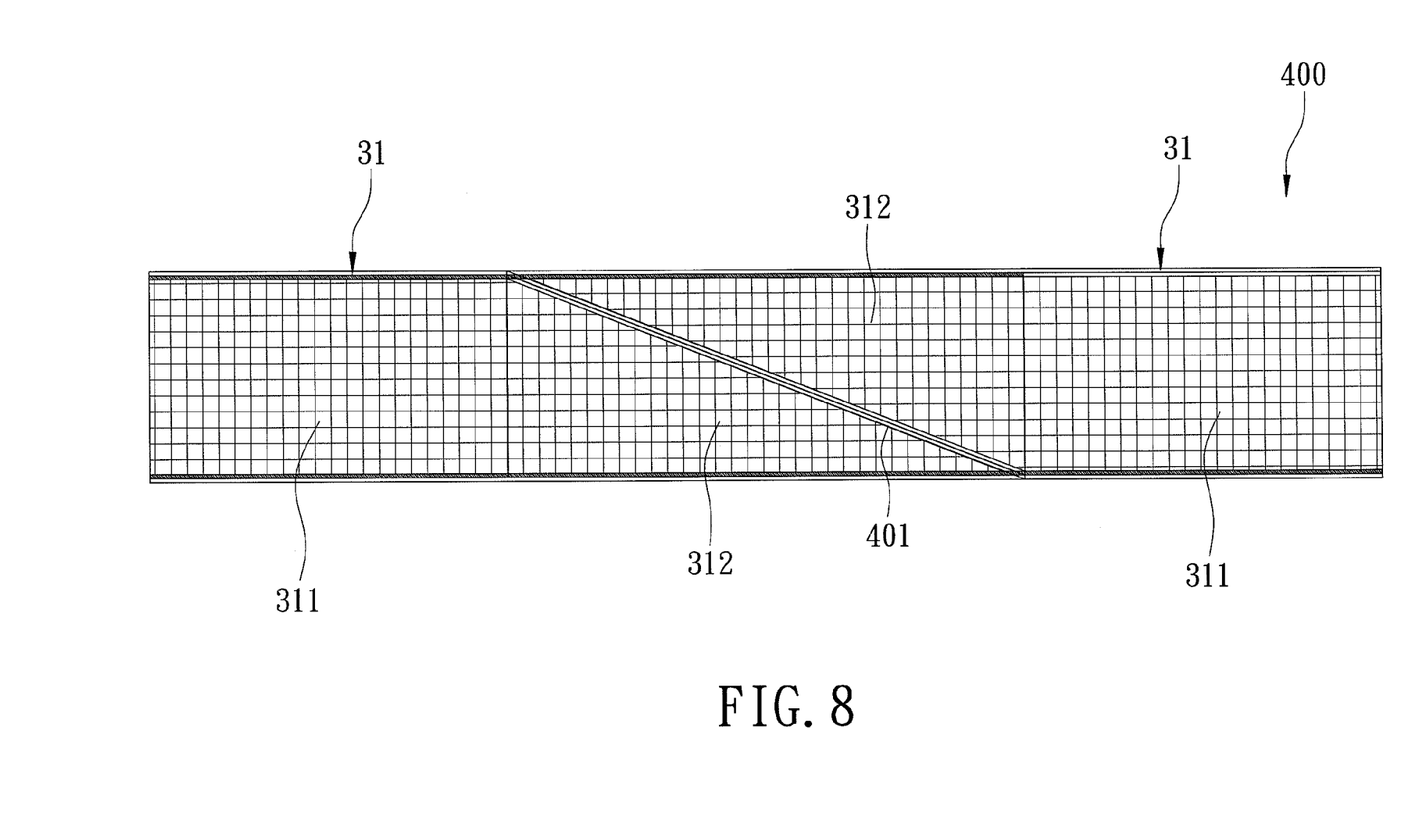
FIG. 8 shows the screen sheets of the second preferred embodiment made from a rectangular blank screen sheet.

Referring to FIG. 8, the screen sheets 31 employed in the second preferred embodiment may be fabricated by first preparing a rectangular blank screen sheet 400 followed by cutting the same along a slanting line 401 to divide the same into two halves. The width of the cage net 3 can be increased by increasing the number of the screen sheets 31. The depth of the cage net 3 can be increased by increasing the length of the rectangular blank screen sheet 400.

When the cage net 3 is used for farming fish, because the bottom wall 301 is cone-shaped and has the circular opening 33, bodies of dead fish that sink can slide downward along the slanting bottom wall 301 to the circular opening 33, thereby facilitating removal of the dead fish bodies.

Figure 9:
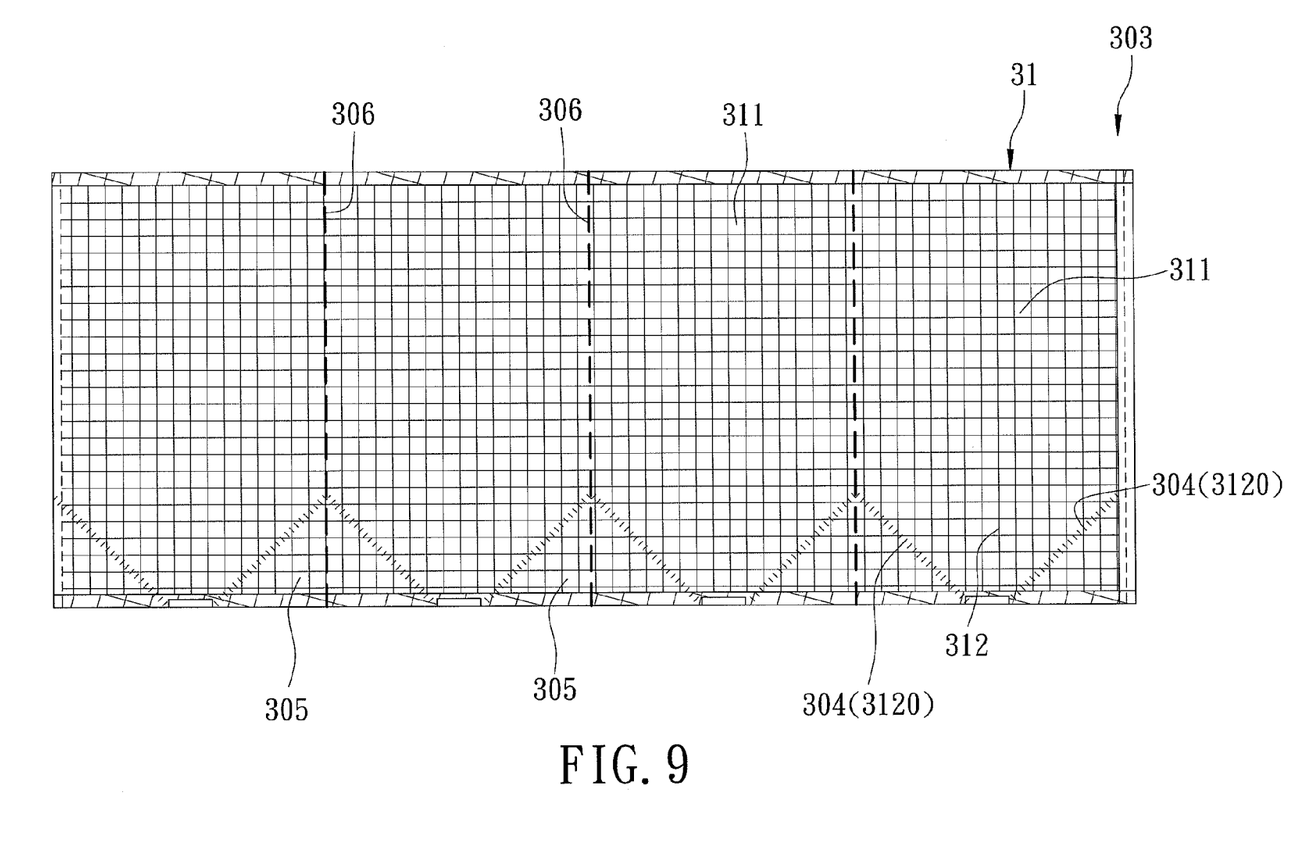
FIG. 9 is an elevation view showing the screen sheets of the cage net assembled according to the third preferred embodiment of the present invention.
Figure 10:
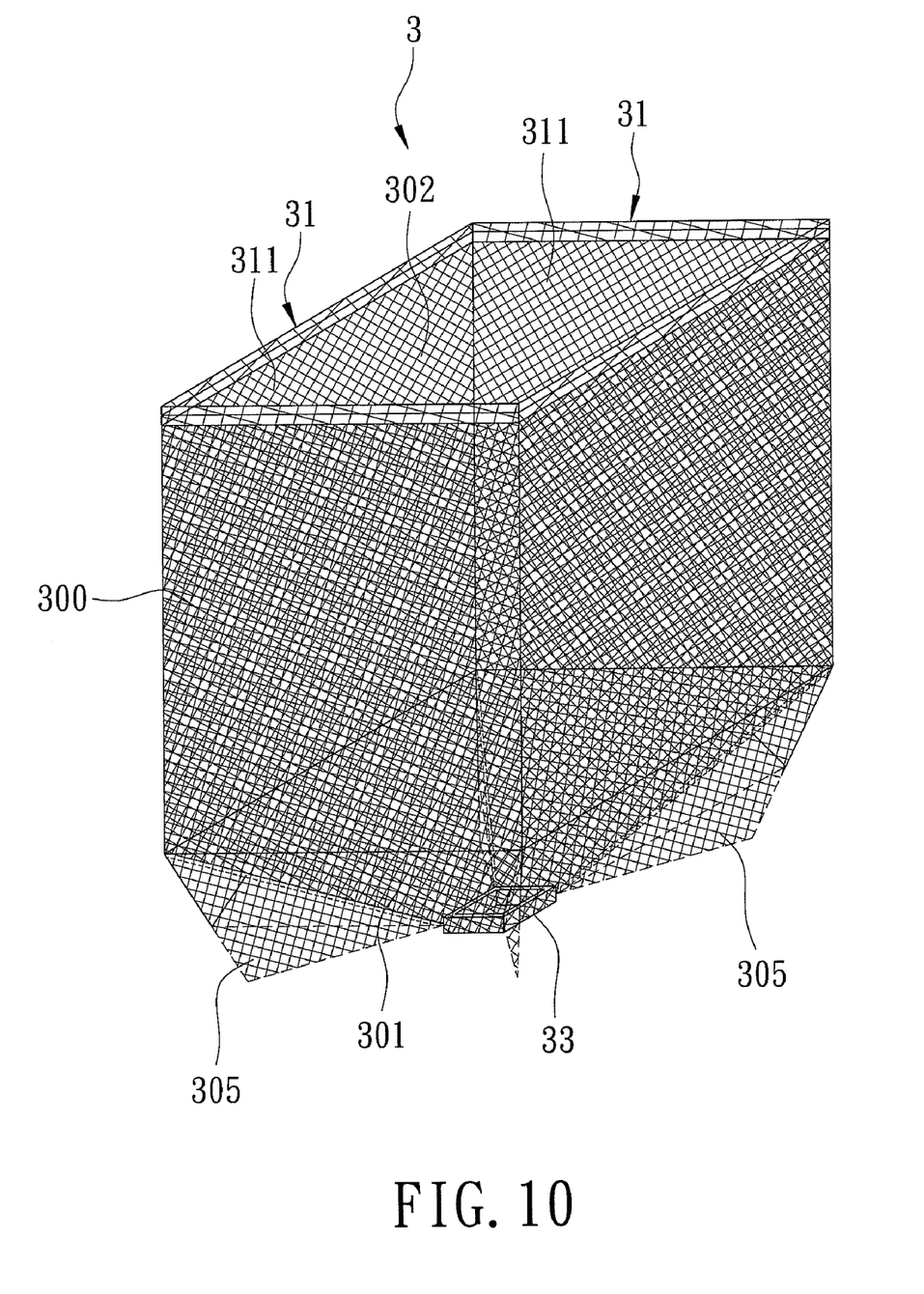
FIG. 10 is a perspective view of the cage net of the third preferred embodiment.

Referring to FIGS. 9 and 10, the third preferred embodiment of a cage net 3 according to the present invention is generally similar to the second preferred embodiment. However, the cage net 3 in this embodiment is suitable for use in a small farming area and includes four screen sheets 31. Each lower section 312 is in the form of a truncated isosceles triangle. The four screen sheets 311 are made by folding a single rectangular blank sheet 303 into four sections along fold lines 306. Each lower section 312 is formed by folding each screen sheet 311 along fold lines 304. After the blank sheet 303 is folded along the fold lines 306, the lower sections 312 are interconnected along the fold lines 304, and the extra areas 305 are pulled outwardly. The cage net 3 as formed has a square opening 33 in the bottom wall 301. The step of interconnecting the upper sections 311 can be eliminated in this embodiment.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A cage net for farming fish, comprising:
a plurality of screen sheets each having an upper section and a tapered lower section, said upper sections of said screen sheets being interconnected side by side to form a surrounding wall, said lower sections of said screen sheets being interconnected side by side to form a bottom wall, each of said lower sections being folded inwardly from a respective one of said upper sections and having a tapered end extending to a substantially central part of said bottom wall, said surrounding and bottom walls confining a receiving space;
wherein each of said upper sections is substantially rectangular and has two longitudinal sides extending in a top-to-bottom direction of said surrounding wall, and each of said lower sections is substantially triangular and has two opposite sides extending respectively from said longitudinal sides to said tapered end; and
wherein each of said lower sections is in the form of a right-angled triangle, one of said opposite sides of each of said lower sections being in line with one of said longitudinal sides of the respective one of said upper sections, the other one of said opposite sides of each of said lower sections being angled from the other one of said longitudinal sides of the respective one of said upper section, said bottom wall further having a circular central opening, and a closure member closing said central opening.

2. The cage net of claim 1, wherein said bottom wall is substantially polygonal.

3. The cage net of claim 1, wherein said bottom wall is substantially circular.

4. The cage net of claim 1, wherein said bottom wall is substantially cone-shaped.

5. The cage net of claim 1, wherein said bottom wall is substantially flat.

6. The cage net of claim 1, further comprising a plurality of tying elements attached to said surrounding wall at different angular positions.

7. The cage net of claim 1, further comprising a plurality of loops attached to said surrounding wall at different angular positions.

8. A cage net for farming fish, comprising:
a plurality of screen sheets each having an upper section and a tapered lower section, said upper sections of said screen sheets being interconnected side by side to form a surrounding wall, said lower sections of said screen sheets being interconnected side by side to form a bottom wall, each of said lower sections being folded inwardly from a respective one of said upper sections and having a tapered end extending to a substantially central part of said bottom wall, said surrounding and bottom walls confining a receiving space;
wherein each of said upper sections is substantially rectangular and has two longitudinal sides extending in a top-to-bottom direction of said surrounding wall; and
wherein each of said lower sections is in the form of a truncated triangle and has two opposite sides extending respectively from said longitudinal sides to said tapered end; said opposite sides of each of said lower sections being angled from said longitudinal sides of the respective one of said upper sections, said bottom wall having a square central opening, and a closure member closing said square central opening.

* * * * *